UNITED STATES PATENT OFFICE.

HENRY ADOLPH KOHMAN, CHARLES HOFFMAN, AND ALFRED EDWARD BLAKE, OF PITTSBURGH, PENNSYLVANIA, ASSIGNORS TO WARD BAKING COMPANY, OF NEW YORK, N. Y., A CORPORATION OF NEW YORK.

MANUFACTURE OF BREAD.

1,158,933.      Specification of Letters Patent.      Patented Nov. 2, 1915.

No Drawing.      Application filed March 26, 1913. Serial No. 756,940.

*To all whom it may concern:*

Be it known that we, HENRY ADOLPH KOHMAN, CHARLES HOFFMAN, and ALFRED EDWARD BLAKE, all citizens of the United States, and residing in Pittsburgh, Allegheny county, State of Pennsylvania, have invented certain new and useful Improvements in and Relating to the Manufacture of Bread; and we do hereby declare the following to be a full, clear, and exact description of the invention, such as will enable others skilled in the art to which it appertains to make and use the same.

The making of leavened bread, as now generally practised is carried on in one of two procedures, known respectively as the sponge process and as the straight dough process. In the sponge process, it is customary to make a preliminary mixture consisting of about one-half of the flour, somewhat more than one-half of the water, and usually all of the yeast. These ingredients are thoroughly mixed, by suitable machinery, and the resulting mixture is withdrawn from the mixing vessel and allowed to ferment for a suitable period of time in a baker's trough. Toward the end of the sponge fermentation, it "falls," and is then permitted to rise again. In this condition, it is transferred into the dough-mixer, wherein it receives the addition of the remainder of the flour and the other constituents which are to enter into the composition of the final dough, as, for instance, the usual amounts of sugar, salt, shortening, milk and the like. The ingredients in the dough-mixer are thereupon thoroughly incorporated with each other, under suitable conditions of temperature. The resulting dough is thereafter allowed to ferment further, under conditions well known to the art, and is, in the usual practice, divided into loaves, compacted, permitted to rise, molded for the pans, subjected to the action of the proofing chamber, and finally baked. These several operations are well understood in the art, and, for that reason, need not be further amplified.

The straight dough process may be stated generally as one wherein the preliminary sponge stage is omitted, and wherein all of the ingredients are usually incorporated with each other at the beginning of the operation. With certain well known differences in the manipulation of the dough during the fermenting period, the straight dough process proceeds along the same general lines as the sponge process after the dough has left the mixer. The practice of baking establishments, both with regard to the sponge process and the straight dough process differs in some details, according to the preference and skill of the operator. Thus, in some instances, it is not unusual in the sponge process, to reserve a portion of the yeast for addition to the final dough batch, where it is desired, for some reason, to stimulate the fermentation in its later period. So also, in other instances, additional starchy material is added to the batch, or the amount of milk and of shortening is increased or diminished, as the case may be.

The present invention, which concerns generally the process of making leavened bread, is based upon the discovery that whether the bread is made in accordance with the sponge process, or in accordance with the straight dough process, the quantity of yeast that would otherwise be necessary for completing the fermentation within a given period of time may be very materially diminished by supplying to the batch certain salts, as hereinafter described, which have a stimulating action upon the activity and propagation of the yeast cells, in the presence of the starchy dough mixture. So also, employing the same quantity of yeast as that ordinarily used, we have discovered that the employment of these salts permits the fermentation of the batch of dough to proceed more rapidly, while still preserving satisfactory commercial conditions, so that, when desired, the bread-making process may be finished in a correspondingly lesser period of time. The salts that we have found serviceable for the purposes referred to are salts of ammonium and salts of calcium. The ammonium salts are themselves utilizable and valuable for the intended use, as are also the calcium salts, and the employment of either the one or the other falls within the broad scope and intent of our invention. We have found, however, that they may be used conjointly to still greater advantage, the action of the ammonium salts being supplemented by the action of the calcium salts, and the latter particularly seeming to have a catalytic action upon the yeast cells, stimulating their secretions and the activity of the secretions in effecting the fermentative changes.

Our invention lends itself particularly to economy of manufacture, for the reason that it can be practised by the aid of ammonium salts and of calcium salts of low cost, as, for instance, by the use of ammonium chlorid and the use of calcium sulfate. It is further characterized by the circumstance that relatively small amounts of these salts are required for the production of the desired effects, which is an additional element of economy. Moreover, the employment of the calcium salts in the bread-making operation is of advantage in that it makes up in part at least the deficiency in calcium salts which is characteristic of white bread, wherein the amount of mineral matter present is extremely low.

As hereinbefore indicated, we prefer and recommend that, in carrying the invention into practice, an ammonium salt and a calcium salt be used conjointly. Thus, by adding to the batch, either at the commencement of the sponge process or at the commencement of the straight dough process, one ounce of ammonium chlorid and two ounces of calcium sulfate to each 100 lbs. of flour contained in the mixture, we are enabled to complete the required fermentation of the batch within a given interval of time, with the employment of about one-half of the quantity of yeast usually required, or, with the employment of a given quantity of yeast, to materially cut down the time required for the fermentation. We do not find it of advantage to increase these proportions, but they may be considerably diminished and yet give important and valuable results. Thus, for instance, the amount of ammonium chlorid used may be say one-half ounce to each 100 lbs. of flour, and it will be found that a resultant saving in yeast, for any given period of fermentation, will be likewise realized. In fact, in such case, the saving in yeast will be considerably greater than one-half the saving that would be incident to the employment of one ounce, under the same conditions. It will be understood, therefore, that in recommending the employment of one ounce of the ammonium chlorid to every 100 lbs. of flour, we do not intend to restrict our invention to that proportion. So also, it is feasible, with useful results, to use a lesser quantity than 2 ounces of the calcium sulfate and, while recommending that amount as preferable, we do not restrict our invention to such proportion.

As hereinbefore indicated, we regard the ammonium salts and the calcium salts as mutually supplementing each other's useful action in realizing the economies incident to the practice of the invention. We have come to this conclusion, for the reason that when using the ammonium salts alone, we obtain the best results with the employment of substantially the same quantity for 100 lbs. of flour that we employ when we likewise employ the calcium sulfate; but the omission of the calcium sulfate is made manifest by a lessened economy in yeast. So also, in using calcium sulfate alone, we find that we obtain the best results with the employment of substantially the same amount of calcium sulfate per 100 lbs. of flour that we obtain when using the ammonium chlorid conjointly therewith, but, in this instance also, with a decrease in the saving of yeast. On the other hand, when we use the same preferred quantity of ammonium chlorid and the same preferred quantity of calcium sulfate conjointly, we find that the resultant effect is to give an increased economy in yeast, which seems to be somewhat in excess of the sum of their individual useful functions. In other words, although individually effective when used alone, in the fermentative process, they likewise mutually contribute to obtain an economy which cannot be realized by the employment of either separately. It will be understood, therefore, that we regard our invention as including not only the discovery of the useful effect incident to the employment of the ammonium salts separately, and the calcium salts separately, but also that it includes the discovery that they may be used to advantage conjointly in effecting the large economy incident thereto.

The ammonium chlorid and calcium sulfate are neutral salts. These particular salts are cheap and they are non-hygroscopic and, with a suitable filler, such as, for instance, flour, or some other suitable starchy material, they are well adapted to be made up into a suitable mixture that can be used with convenience and accuracy as a composition of matter for sale to the trade. It will be understood, however, that we do not restrict our invention to the employment of ammonium chlorid or of calcium sulfate, nor to the employment of neutral ammonium or calcium salts. Thus, in some instances, it may be feasible and desirable to use the acid salts or even those salts which give an alkaline reaction. For instance, calcium di-acid phosphate $Ca(H_2PO_4)_2$, is available for the purpose, in lieu of calcium sulfate, and ammonium acid tartrate $K(NH_4)C_4H_4O_6$, is available in lieu of ammonium chlorid, although in both instances, the acid salts that are referred to are of higher cost.

Where the ammonium salt or the calcium salt, or both, are, as hereinbefore proposed, put upon the market in the form of a composition of matter in connection with a filler of flour or other starchy material, the filler should be of such relatively large amount (say ten times the amount by weight of the salt) that any slight inaccuracies of the user in adding the mixture to the batch, will be correspondingly unimportant for the realization of the intended results. It is further apparent that, if desired, the necessary proportion of salts may be incorporated in the flour at the time it is barreled at the mill, and may be sold to the trade in that form.

It is a characteristic of our invention that the fermentation proceeds more slowly in the initial part of the fermentative process than is the case with the ordinary dough-raising operation. As the fermentation proceeds, however, its rate increases, so that, as hereinbefore indicated, the batch is "ready" at the same time that the batch would be ready in the ordinary process. In view of the fact that the rate of progress of the fermentative action is less in the initial stage of the operation, which fact is manifested by the lesser production of carbonic acid, there is a surprisingly lessened consumption of sugar in the use of our process, the saving in this regard, amounting, under favorable circumstances, to as much as 1 pound in the treatment of a batch of one barrel of flour. We also find that bread made in accordance with our invention is appreciably lighter in color than when made by the ordinary process conducted under otherwise similar conditions.

Having thus described our invention what we claim is:—

1. The process of making leavened bread, which comprises incorporating with the flour and other ingredients of the dough batch an amount of yeast normally insufficient to effect the desired leavening within a given time period, further incorporating in the dough batch a quantity of an innocuous salt of ammonium and thereby economizing in the amount of yeast normally employed for said period, and fermenting the batch; substantially as described.

2. The process of making leavened bread, which comprises incorporating with the flour and other ingredients of the dough batch an amount of yeast normally insufficient to effect the desired leavening within a given time period, further incorporating in the dough batch a quantity of an innocuous salt of ammonium and an innocuous salt of calcium and thereby economizing in the amount of yeast normally employed for said period, and fermenting the batch; substantially as described.

3. The process of making leavened bread, which comprises incorporating with the flour and other ingredients of the dough batch an amount of yeast normally insufficient to effect the desired leavening within a given time period, further incorporating in the dough batch a quantity of an ammonium chlorid and thereby economizing in the amount of yeast normally employed for said period, and fermenting the batch; substantially as described.

4. The process of making leavened bread, which comprises incorporating with the flour and other ingredients of the dough batch an amount of yeast normally insufficient to effect the desired leavening within a given time period, further incorporating in the dough batch a quantity of ammonium chlorid and calcium sulfate and thereby economizing in the amount of yeast normally employed for said period, and fermenting the batch; substantially as described.

5. The process of making leavened bread, which comprises effecting a saving of sugar during the fermenting of the dough batch by associating therewith innocuous salts which retard the conversion of sugar by the yeast during the initial period of the fermentation; substantially as described.

In testimony whereof we affix our signatures, in presence of two witnesses.

HENRY ADOLPH KOHMAN.
CHARLES HOFFMAN.
ALFRED EDWARD BLAKE.

Witnesses:
H. H. SMITH,
S. C. PERRING.